(12) United States Patent
Hetzel

(10) Patent No.: US 8,303,371 B2
(45) Date of Patent: Nov. 6, 2012

(54) SUPPORT FOR TREAD BAND BUFFING

(75) Inventor: Peter D. Hetzel, Greer, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 589 days.

(21) Appl. No.: 12/446,018

(22) PCT Filed: Nov. 30, 2006

(86) PCT No.: PCT/US2006/045869
§ 371 (c)(1),
(2), (4) Date: Apr. 17, 2009

(87) PCT Pub. No.: WO2008/066534
PCT Pub. Date: Jun. 5, 2008

(65) Prior Publication Data
US 2010/0323583 A1    Dec. 23, 2010

(51) Int. Cl.
*B24B 1/00* (2006.01)
*B24B 47/02* (2006.01)
(52) U.S. Cl. .................... 451/28; 451/338; 451/914
(58) Field of Classification Search .......... 451/28, 451/338, 368, 914, 49, 332, 184, 188, 183; 269/289 MR, 289 M, 308, 310; 206/564
See application file for complete search history.

(56) References Cited

U.S. PATENT DOCUMENTS

| | | | |
|---|---|---|---|
| 4,515,103 A | | 5/1985 | Greig |
| 4,679,354 A | * | 7/1987 | Holst et al. ............. 451/184 |
| 4,845,897 A | * | 7/1989 | Holst et al. ............. 451/184 |
| 5,738,571 A | * | 4/1998 | Kitahama et al. ....... 451/188 |
| 7,101,262 B2 | * | 9/2006 | Hilicus, Sr. ............. 451/49 |

FOREIGN PATENT DOCUMENTS

| | | |
|---|---|---|
| EP | 0 464 657 A1 | 1/1992 |
| JP | 62 087334 A | 4/1987 |
| JP | 5 116235 A | 5/1993 |
| JP | 7 108629 A | 4/1995 |
| JP | 2002 086588 A | 3/2002 |

OTHER PUBLICATIONS

International Search Report, PCT/US06/45869, dated Apr. 6, 2007.
Abstract of JP 62087334 (A) printed from http://worldwide.espacenet.com, 1 pg, Apr. 21, 1987.
Abstract of JP 5116235 (A) printed from http://worldwide.espacenet.com, 1 pg, May 14, 1993.
Abstract of JP 7108629 (A) printed from http://worldwide.espacenet.com, 1 pg, Apr. 25, 1995.
Abstract of JP 2002086588 (A) printed from http://worldwide.espacenet.com, 1 pg, Mar. 26, 2002.

* cited by examiner

*Primary Examiner* — Dung Van Nguyen
(74) *Attorney, Agent, or Firm* — Hahn Loeser & Parks LLP; Bret A. Hrivnak, Esq.

(57) ABSTRACT

An apparatus and method of roughening the sole side surface of a tread band is provided wherein the sole side surface of a tread band is roughened with at least one abrasive roller. The bottom of at least one groove in a tread side of the tread band is supported while the abrasive roller is roughening the sole side surface opposite the supported groove.

18 Claims, 3 Drawing Sheets

SUPPORT FOR TREAD BAND BUFFING

BACKGROUND OF THE INVENTION

1. Field of the Invention

The present invention is in the field of cured tire treads for retreading tires.

2. Description of the Related Art

When tires become worn, they can be restored with new tread. In the cold recapping process, a cured rubber tread band with a tread pattern already impressed in its outer surface is attached to a tire carcass, often with a cushion gum layer between the tread band and the tire carcass. The tire is then placed in an autoclave, and heated under pressure for an appropriate time to induce curing of the gum layer, and binding of the gum layer to the inner or sole side of the tread layer and the carcass. The term "cure" refers to the formation of cross-links between the elastomer molecules in the rubber compound.

In order to improve the bonding of the cured tread layer to the carcass, the sole side surface of the cured tread layer may be textured. One known texturing process uses a brush or grinding wheel to impart to the rubber surface a roughness that is suitable for the subsequent bonding. An additional benefit of the texturing process is that it removes any mold release agents from the surface of the rubber. The mold release agents typically include silicone which has an adverse effect on the bonding of the sole side surface of the tread band.

A schematic view of a prior art texturing process is shown in FIG. 1. A tread band 20 is positioned between a series of support rollers 30 and abrasive rollers 40. The support rollers 30 engage the top surface 22 of the tread side 24 of the tread band 20 while the abrasive rollers 40 engage the sole side surface 26 of the tread band 20. The abrasive rollers 40 are being pushed downward on the tread band 20 while the abrasive rollers 40 rotate to impart a texturing or roughening to the sole side surface 26 of the tread band 20. A problem with this prior art method becomes apparent when using this process on tread bands 20 having wide and/or deep grooves 28. An example of tread band 20 having such a tread pattern is shown in FIG. 2. When a tread band 20 having tread patterns exhibiting wide and/or deep grooves 28 is roughened according to the process shown in FIG. 1, the grooves 28 are unsupported by the support rollers 30. The lack of support allows the sole side surface 26 of the tread band 20 to deflect away from the abrasive rollers 40. This may result in unroughened areas 32 of the sole side surface 26 opposite the grooves 28 of the tread side 24 of the tread band 20 as best shown in FIG. 3.

SUMMARY OF THE INVENTION

A particular embodiment of the present invention includes a method of roughening the sole side surface of a tread band, the method comprising the steps of: roughening the sole side surface of a tread band with at least one abrasive roller; and supporting a bottom of at least one groove in a tread side of the tread band while the abrasive roller is roughening the sole side surface opposite the supported groove.

Another particular embodiment of the present invention includes a support roller for texturing a tread band, the roller comprising: a cylindrical tread support surface; and a plurality of groove support elements extending from the cylindrical tread support surface and corresponding to a predetermined tread pattern.

Another particular embodiment of the present invention includes a support for texturing a tread band, the support comprising: a continuous flexible tread support surface positioned about at least two support rollers; and a plurality of groove support elements extending from the tread support surface and corresponding to a predetermined tread pattern; wherein the tread support moves about the at least two support rollers.

Another particular embodiment of the present invention includes a support for texturing a tread band, the support comprising: a moveable tread support surface; an inflatable membrane positioned about the moveable tread support surface; wherein the inflatable membrane is partially filled to provide an expanded support projection capable of supporting a bottom of a groove of a tread band during an abrasion process of the sole side of the tread band.

Another particular embodiment of the present invention includes a tread band tray comprising: a generally planar tread support surface; a plurality of groove support elements extending from the tread support surface and corresponding to a predetermined tread pattern; wherein the tray does not include any support elements for any grooves having a width of less than 3.0 mm.

These and other advantages will be apparent upon a review of the detailed description of the invention.

DETAILED DESCRIPTION OF THE DRAWINGS

Figure 1:
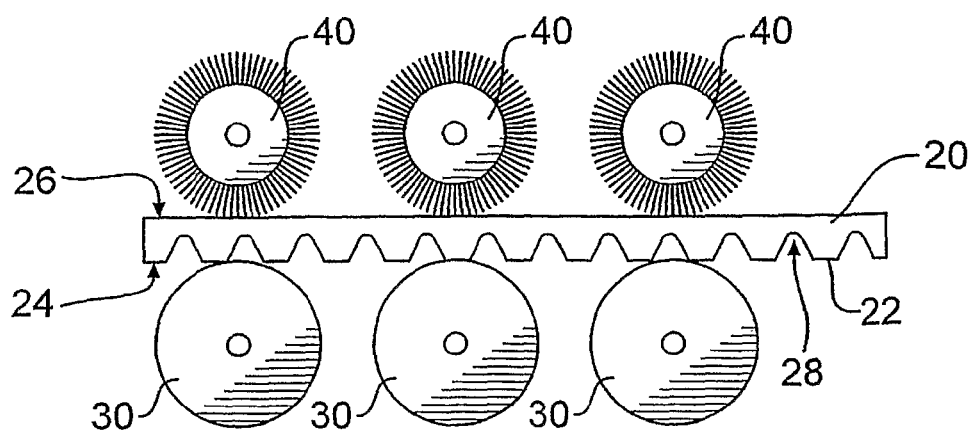
FIG. 1 shows a tire having deep grooves in the tread of the tire.
Figure 2:
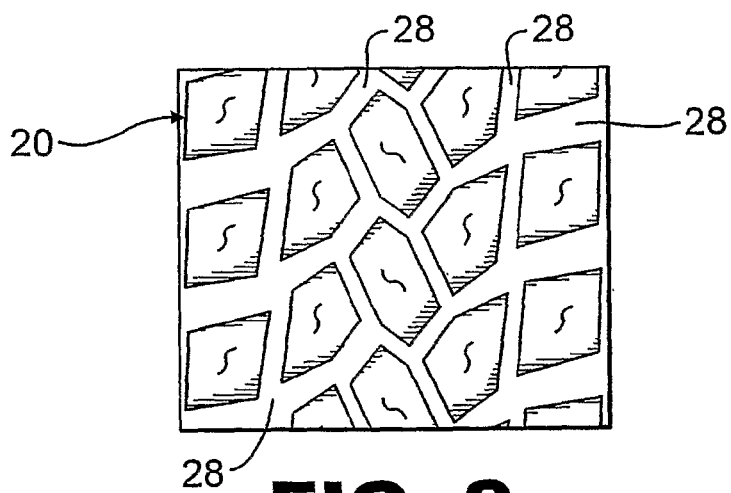
FIG. 2 shows a schematic view of a prior art method of brushing the sole side of a tread band using smooth support rollers.
Figure 3:
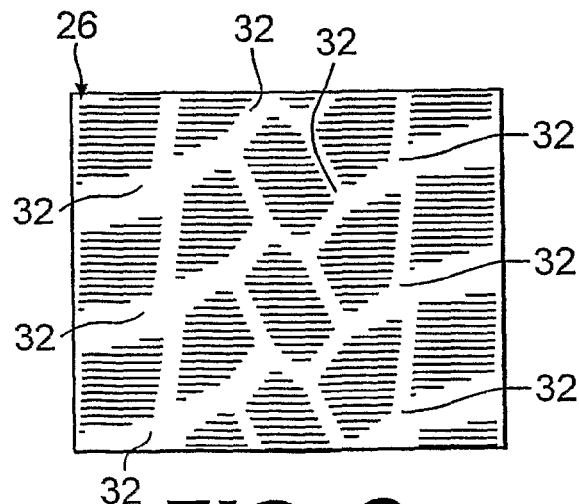
FIG. 3 shows a perspective view of the sole side of the tread band after being subjected to the brushing process of FIG. 1.

Referring now to FIGS. 4-7, a method of roughening the sole side surface of a tread band is provided wherein the sole side surface 26 of a tread band 20 with at least one abrasive roller 40 while a bottom 29 of at least one groove 28 in a tread side 24 of the tread band 20 is supported while the abrasive roller 40 is roughening the sole side surface 26 opposite the supported groove 28. It is contemplated that the abrasive roller 40 can be a brushing wheel or any other mechanism for imparting a texture to the sole side surface 26 of the tread band 20.

Figure 4:
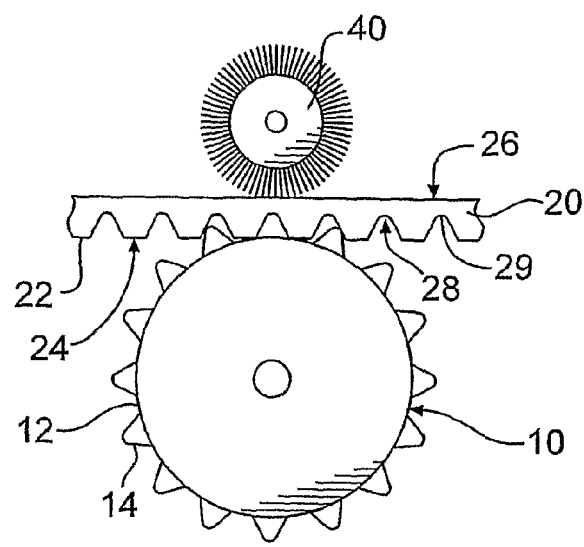
FIG. 4 shows an embodiment wherein the support surface is formed as a roller.

In particular, referring now to FIG. 4, a support roller 10 is shown having a generally cylindrical body. The circumferential surface 12 of the support roller 10 supports the top surface 22 of the tread side 24 of the tread band 20. A plurality of projections 14 extend from the circumferential surface 12 of the roller 10. The projections 14 correspond in location and height to the location and depth of the grooves 28 in the tread band 20. The support roller 10 is rotated such that the projections 14 engage and support the bottoms 29 of the grooves 28 at least when the abrasive roller 40 is roughening the sole side surface 26 of the tread band 20 opposite the supported groove 28.

It is anticipated that the projections 14 on the roller 10 match a predetermined tread pattern of a particular tread band 20. However, smaller grooves and/or shallow grooves may not require a projection 14 to ensure proper texturing. If the tread pattern repeatedly varies along the length of the tread band 20, the roller 10 will be of sufficient size to accommodate at least one period of the repeating tread pattern. The smaller the roller 10 (and/or the deeper the grooves 28 in the tread band 20), the more likely that there may be a problem with insertion of the projections 14 into the grooves 28 of the tread band 20. Having a larger roller 10 will help prevent insertion problems.

Figure 5:
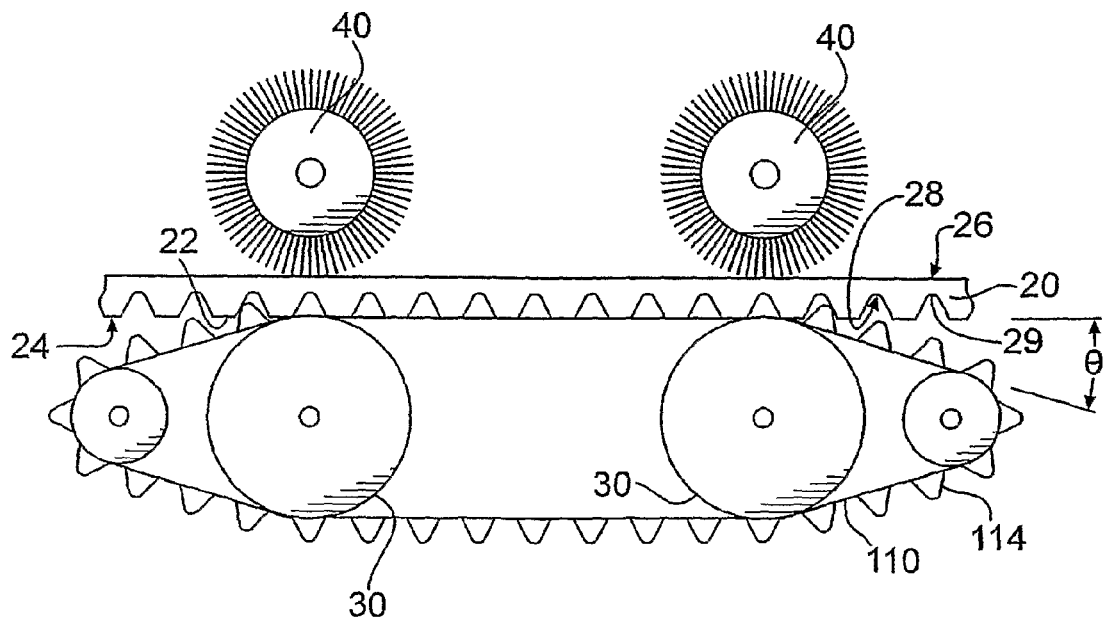
FIG. 5 shows an embodiment wherein the support surface is formed as a track.
Figure 6:
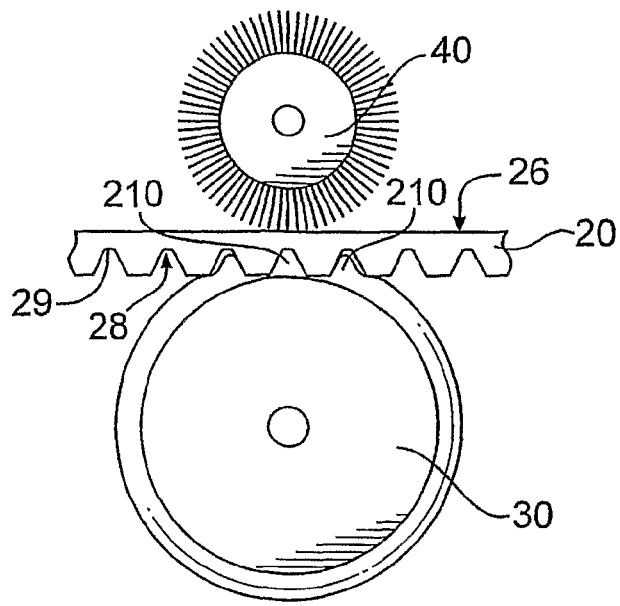
FIG. 6 shows an embodiment wherein the support surface is fowled at least partially as an inflatable membrane.
Figure 7:
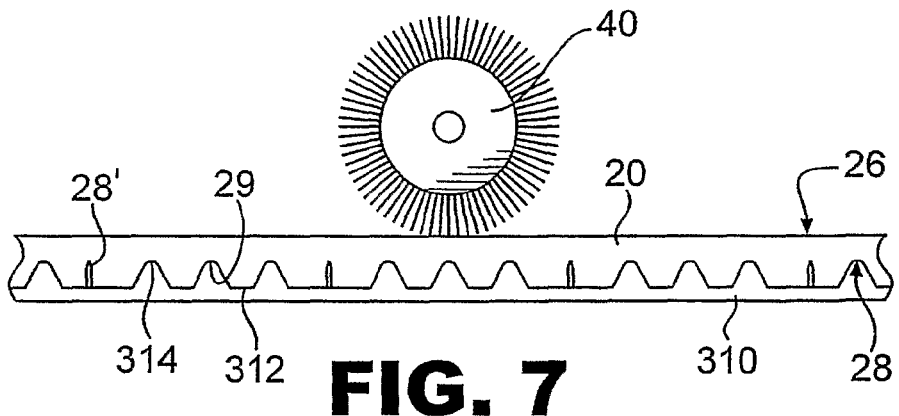
FIG. 7 shows an embodiment of the invention wherein the support surface is formed as a tray.

Another embodiment of the invention is shown in FIG. 5. In this embodiment, a track 110 is moveably positioned between the tread band 20 and the support rollers 30. The track 110 is flexible and the top surface 22 of the tread side 24 of the tread band 20 engages the track 110. A plurality of projections 114 extend from the outer surface 112 of the track 110. The projections 114 correspond in location and height to the location and depth of the grooves 28 in the tread band 20. The support rollers 30 are rotated to move the track 110 such that the projections 114 engage and support the bottoms 29 of the grooves 28 at least when the abrasive roller 40 is roughening the sole side surface 26 of the tread band 20 opposite the supported groove 28.

It is anticipated that the projections 114 on the track match a predetermined tread pattern of a particular tread band 20. However, smaller grooves and/or shallow grooves may not require a projection 114 to ensure proper texturing. If the tread pattern repeatedly varies along the length of the tread band 20, the track 110 will be of sufficient length to accommodate at least one period of the repeating tread pattern. As shown in FIG. 5, the track 110 may utilize secondary rollers 31' that can help eliminate any problems relating to insertion/removal of the projections 114 into and out of the grooves 28 of the tread band 20 by providing a small insertion angle θ between the tread band 20 and the track 110. It is contemplated an angle θ between 15 to 45 degrees would be appropriate; however the invention is not limited to any particular angle.

In the previous embodiments, each different tread pattern typically requires a different roller 10 or track 110. In the embodiment shown in FIG. 6, a supporting roller 30 having an inflatable membrane 210 is shown. The inflatable membrane 210 can be used in conjunction with a roller or a track, however, instead of projections, the inflatable membrane 210 expands into the grooves 28 of the tread band 20 and supports the bottoms 29 of the grooves 28 at least when the abrasive roller 40 is roughening the sole side surface 26 of the tread band 20 opposite the supported groove 28. The inflatable membrane 210 may be any suitable material and also may be partially deflated to allow for compression by the non-groove tread elements of the tread side 24 of the tread band 20. Gases, such as air or nitrogen, or liquids, such as water or glycerin, may be used as an inflating fluid.

In another embodiment of the invention, a tray 310 is used instead of the support rollers 30. The tray 310 is generally a flat surface 312 that supports the top surface 22 of the tread side 24 of the tread band 20 and is capable of withstanding the pressure applied by the abrasive rollers 40. A plurality of projections 314 extend from the flat surface 312 of the tray 310. The projections 314 correspond in location and height to the location and depth of the grooves 28 in the tread band 20. The projections 314 engage and support the bottoms 29 of the grooves 28 when the abrasive roller 40 is roughening the sole side surface 26 of the tread band 20 opposite the supported groove 28. It is anticipated that the projections 314 on the tray 310 match a predetermined tread pattern of a particular tread band 20. As with the previous embodiments, smaller grooves and/or shallow grooves 28' may not require a projection 314 to ensure proper texturing, for example, lateral grooves and incisions having a width of less than 3.0 mm.

Figure 8:
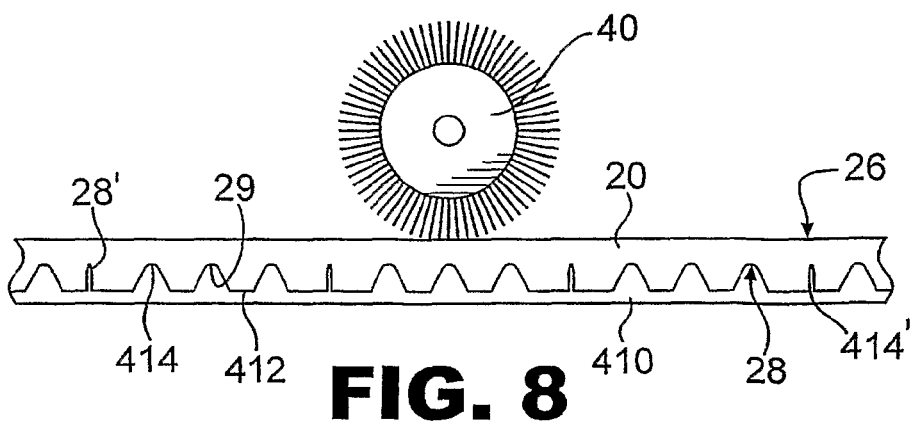
FIG. 8 shows an embodiment wherein the support surface is the tread half of the mold.

In one embodiment of the invention, it is contemplated that the tread side of the tread band mold 410 could be used to support the tread band 20 as shown in FIG. 8. A plurality of mold elements 414 extend from the flat surface 412 of the mold 410. The mold elements 414 form the grooves 28 in the tread band 20. Accordingly, the mold elements 414 engage and support the bottoms 29 of the grooves 28 when the abrasive roller 40 is roughening the sole side surface 26 of the tread band 20 opposite the supported groove 28. In this embodiment, even the smaller grooves and/or shallow grooves 28' will be supported by the mold element 414' forming the feature.

While this invention has been described with reference to preferred embodiments thereof, it shall be understood that such description is by way of illustration and not by way of limitation. Accordingly, the scope and content of the present invention are to be defined only by the terms of the appended claims.

What is claimed is:

1. A method of roughening a sole side surface of a tread band, the method comprising the steps of:
   roughening the sole side surface of a tread band with at least one abrasive roller, the tread band having a thickness bounded by the sole side surface and a tread side of the tread band, the tread side having at least one groove extending into the tread thickness, the at least one groove having a bottom arranged within the tread thickness; and
   supporting the bottom of at least one groove in the tread side of the tread band while the abrasive roller is roughening the sole side surface opposite the supported groove.

2. The method of claim 1, wherein the step of supporting at least one groove of the tread side of the tread band is accomplished by the steps of:
   supporting the tread side of the tread band with a support roller surface;
   rotating the support roller surface;
   supporting the bottom of at least one groove of the tread side of the tread band with at least one projection extending from the support roller.

3. The method of claim 1, wherein the step of supporting at least one groove of the tread side of the tread band is accomplished by the steps of:
   supporting the tread side of the tread band with a track surface supported on at least two support rollers;
   rotating the support rollers to move the track surface;
   supporting the bottom of at least one groove of the tread side of the tread band with at least one projection extending from the track surface.

4. The method of claim 3 further comprising the step of:
   angling the approach of the track moving toward the tread band at an angle of 15-45 degrees.

5. The method of claim 1, wherein the step of supporting at least one groove of the tread side of the tread band is accomplished by the steps of:
   attaching an inflatable membrane to a track or support roller;
   at least partially inflating the inflatable membrane;
   supporting the bottom of at least one groove of the tread side of the tread band with at least a portion of the inflatable membrane expanding in the at least one groove of the tread side of the tread band.

6. The method of claim 1, wherein the step of supporting at least one groove of the tread side of the tread band is accomplished by the steps of:
- placing the tread band in a tray to support the tread side of the tread band;
- supporting the bottom of at least one groove of the tread side of the tread band with at least one projection extending from the tray.

7. The method of claim 1, wherein the step of supporting at least one groove of the tread side of the tread band is accomplished by the steps of:
- molding a tread in a mold having a tread side mold and a sole side mold;
- exposing the sole side surface of the tread band by removing the sole side mold prior to the step of roughening the sole side surface of a tread band with at least one abrasive roller.

8. A tread support for supporting a tread during tread texturing operations, the support comprising:
- a tread support surface configured to support a tread outer surface; and
- at least one groove support element configured to engage a bottom of a groove of a predetermined tread pattern extending into the tread outer surface, the bottom of the groove arranged within the tread thickness.

9. The support of claim 8, wherein the support surface comprises a cylindrical tread support surface and where the at least one groove support element comprises a plurality of groove support elements extending from the cylindrical tread support surface and corresponding to a predetermined tread pattern.

10. The support of claim 8, where the support surface comprises a continuous flexible tread support surface positioned about at least two support rollers; and the at least one groove support element comprises a plurality of groove support elements extending from the tread support surface and corresponding to a predetermined tread pattern;
- wherein the tread support moves about the at least two support rollers.

11. The support of claim 8, where the support surface comprises a moveable tread support surface and an inflatable membrane positioned about the moveable tread support surface;
- wherein the inflatable membrane is partially filled to provide an expanded support projection comprising the at least one groove support element, the expanded support projection supporting a bottom of a groove of a tread band during an abrasion process of the sole side of the tread band.

12. The support of claim 11, wherein the moveable support surface is provided by a cylindrical drum roller.

13. The support of claim 12 further comprising:
- an abrasive roller arranged on an opposing side of the tread thickness relative the at least one groove support element.

14. The support of claim 11, wherein the moveable support surface is provided by a flexible track moveable about at least two support rollers.

15. The support of claim 14 further comprising:
- an abrasive roller arranged on an opposing side of the tread thickness relative the at least one groove support element.

16. The support of claim 11 further comprising:
- an abrasive roller arranged on an opposing side of the tread thickness relative the at least one groove support element.

17. The support of claim 8, where the support surface comprises a generally planar tread support surface and the at least one groove support element comprises a plurality of groove support elements extending from the tread support surface;
- wherein the tray does not include any support elements for any grooves having a width of less than 3.0 mm.

18. The support of claim 8 further comprising:
- an abrasive roller arranged on an opposing side of the tread thickness relative the at least one groove support element.

* * * * *